3,791,961
COMBINATION REFORMING PROCESS
John H. Sinfelt, Berkeley Heights, N.J., assignor to Esso Research and Engineering Company
No Drawing. Continuation-in-part of abandoned application Ser. No. 883,601, Dec. 9, 1969. This application Dec. 7, 1971, Ser. No. 205,729
The portion of the term of the patent subsequent to Dec. 14, 1988, has been disclaimed
Int. Cl. C10g 39/00
U.S. Cl. 208—65   27 Claims

ABSTRACT OF THE DISCLOSURE

A conventional naphthene dehydrogenation catalyst, such as a platinum-halogen-alumina catalyst, is used in the initial zone or reactors in a catalytic reforming process; the tail zone or reactors contains a supported Group VIII polymetallic catalyst with platinum as one of the metallic components. In a preferred embodiment, the tail zone contains a platinum-iridium catalyst on a porous support such as alumina. In the tail reactors, conversion of paraffins is of primary importance, along with dealkylation of alkylbenzenes; in the initial reactors the predominant reaction is the conversion of naphthenes to aromatics. The combination process results in the formation of a significantly greater octane number product than is obtained in a conventional reforming process in which platinum-alumina catalyst is used throughout.

CROSS-REFERENCE TO RELATED APPLICATION

This application is a continuation-in-part of Ser. No. 883,601, filed Dec. 9, 1969, now abandoned.

BACKGROUND OF THE INVENTION

Catalytic reforming is now a matter of record and commercial practice in this country. Basically, reforming involves the contacting of a naphtha fraction, either virgin, cracked, Fischer-Tropsch or any mixtures thereof, with a solid catalytic material. The catalyst is ordinarily a supported noble metal catalyst, such as platinum on alumina. Contacting takes place at elevated temperatures and pressures in the presence of added or recycled hydrogen. Hydrogen is essential since it suppresses the deactivation of the catalyst. The process itself produces substantial amounts of hydrogen, and in actuality this is the source of the hydrogen which is recycled to repress the deactivation of the catalyst; the deactivation of the catalyst is caused at least in part by carbon formation.

Reactions involved in catalytic reforming are: (1) dehydrogenation of naphthenes to the corresponding aromatic hydrocarbons such as methylcyclohexane dehydrogenation to toluene; (2) isomerization of normal paraffins to branched-chain paraffins or isomerization of ring compounds, such as ethylcyclopentane to methylcyclohexane, which latter compound readily dehydrogenates to form toluene; (3) dehydrocyclization of paraffins to aromatics, e.g., n-heptane to toluene; and (4) hydrocracking of the higher boiling constituents.

Fixed bed catalytic reforming processes may be divided into three general classes: non-regenerative, semi-regenerative and cyclic. The three processes differ most significantly in that the cyclic has an alternate or swing reactor which is so manifolded that it may replace any reactor within the system in order that the replaced reactor may be regenerated. The instant invention is intended to include all classes of reforming.

A great variety of catalysts for catalytically reforming a naphtha feed stream are known; perhaps the best known of these catalysts is platinum dispersed upon a highly purified alumina support such as one may obtain from aluminum alcoholate. Such a catalyst is described in detail in U.S. Pat. 2,636,865, the disclosure of which is herein incorporated by reference. Other members of the platinum group such as palladium or rhodium may be utilized, but platinum is much preferred. The alumina support should have a high surface area, greater than 50 m.²/gm. It should also have acidic properties, and hence must be substantially free of alkaline impurities. The final catalyst commonly comprises about 0.2 to 0.8 weight percent metal highly dispersed upon alumina, and contains about 0.3 to 1.3 percent halogen, either chlorine or fluorine or both.

The platinum-on-alumina catalyst is outstanding for the selective conversion of naphthenes to aromatics (naphthene dehydrogenation), but is limited in its ability to convert paraffinic components in the feed. The problem in making the process more effective is thus a matter of increasing the activity in the tail reactors for the conversion of paraffins, preferably to aromatics, while simultaneously retaining the ability of platinum to convert naphthenes to aromatics in the initial zone.

SUMMARY OF THE INVENTION

According to this invention, it has been unexpectedly discovered that if a catalytic reforming operation is conducted in a train or series of three or four or more catalytic reforming reactors comprising at least two separate catalytic reforming zones, with different catalysts, the combined rate of conversion of naphthenes and paraffins is increased. The initial zone which usually comprises the first, or first and second reactors, or first, second and third reactors, contains a supported metallic naphthene dehydrogenation catalyst that is substantially free of a catalyst specie consisting of platinum and iridium supported on alumina. The preferred catalyst is a platinum group reforming catalyst such as platinum supported on a halogen-containing alumina base. The tail zone which usually comprises the final two or three reactors contains a supported Group VIII bimetallic catalyst with platinum as one of the metallic components, preferably a platinum-iridium catalyst. The use of this two-zone catalytic reforming system results in the formation of a product having octane numbers significantly higher than that which can be obtained when the conventional platinum-halogen-alumina catalyst is employed throughout the system.

In the catalytic reforming process, the conversion of naphthenes to the corresponding aromatic hydrocarbons takes place for the most part in the initial zone of the reactor train even though considerable amounts of paraffins, both normal and iso, may be present in the feed stream to the first reaction zone. In the tail zone, paraffin conversion reactions predominate, either aromatization or hydrocracking. The aromatization reaction is extremely important if one is desirous of producing maximum yield of high octane gasoline. Without effective conversion of paraffins to aromatics, octane improvement must be obtained by hydrocracking the paraffins to concentrate the aromatics already formed from naphthenes. This severely limits the yield of reformate obtainable when processing to very high octane numbers.

A platinum-halogen-alumina catalyst is especially effective for naphthene dehydrogenation. It has unexpectedly been found, according to the instant invention, that after the bulk of the naphthenes in the feed stream have been converted to aromatics, thus decreasing the naphthene content to a maximum level of about 15 weight percent, the converted feed stream, if contacted with a supported Group VIII polymetallic catalyst with platinum as one of the components, preferably a platinum-iridium catalyst, will yield a much higher octane number product than would have been obtained by further processing over the original platinum-halogen-alumina catalyst.

In more detail, the instant invention pertains to the catalytic reforming of a naphtha feed stream. A naphtha feed stream is a petroleum fraction boiling between about 80 and 450° F., preferably between 120° and 400° F. The feed stream generally contains about 15 to 75 weight percent by weight of paraffins, in excess of about 15 weight percent, preferably about 15 to 75 weight percent by weight of naphthenes and about 2 to 20 weight percent of aromatics. Typically, when treated in a catalytic reforming train of three or four reactors, after passing through two of the reactors, the feed stream would contain about 2 to 15 weight percent naphthenes, the remainder consisting of aromatics and unconverted paraffins.

The catalyst utilized in the initial zone contains at least one Group VII and/or Group VIII metal, desirably a member of the platinum group, preferably platinum itself, deposited on a high surface area porous support, i.e., 50 to 300 $m.^2/g$. Any naphthene dehydrogenation catalyst that is substantially free of a catalyst specie consisting of platinum and iridium supported on alumina may be used in the initial zone of the reforming system. Platinum is the preferred catalyst metal and may be used alone or in combination with other metals. Useful combinations include platinum-rhenium, platinum-germanium, platinum-iridium-rhenium, platinum-iridium-gold, etc.

The catalyst support, which may be the same in all reactors, is preferably an inorganic refractory oxide such as alumina (preferably the gamma or eta forms), $TiO_2$, ZnO, MgO, zirconium dioxide, etc., or a mixed inorganic refractory oxide such as silica-alumina, silica-magnesia, or silica-alumina-magnesia. Other useful, but less preferred, support materials include carbon, silica or silica gel, clays, silicates (natural or synthetic), ceramics, bauxite, crushed firebrick, charcoal, crystalline aluminosilicates, e.g., mordenite and/or faujasite (hydrogen form or a multivalent metal exchanged form), etc.

The catalyst desirably contains small amounts of halogen, boria, or additional components designed to impart acidity or stability to the catalyst composite. Other catalyst metals, such as gold, silver, copper, germanium, etc., may be present. The form in which halogen is present in the catalyst is not precisely known. For convenience, the halogen constituent is said to be present as combined halogen although it should be understood that the halogen may be present on the catalyst in a free, ionically combined (halides) or complexed form. Preferred halogens which may be utilized are chlorine or fluorine or a mixture of both. As a rule, the Group VII and/or Group VIII catalyst metals, preferably platinum, comprises about 0.01 to 2.0 percent by weight of the catalyst; the major part of the catalyst is the support which usually varies between 96 percent by weight and 99.98 percent by weight of the total catalyst. Halogen, if utilized, comprises about 0.01 to 4.0 weight percent of the catalyst, preferably 0.01 to 1.5 weight percent.

The reactors to which at least a portion of the feed stream is passed after the naphthene content has been decreased to a level below about 15 weight percent, preferably below about 10 weight percent and most preferably below about 5 weight percent, contain a supported platinum-containing polymetallic dehydrocyclization catalyst. The tail reaction zone normally comprises the second and third reactors in a three reactor train or the third and fourth reactors in a four reactor train. In a four reactor train, the polymetallic catalyst can be employed in all reactors after the first, depending on the particular feed stock which is to be reformed and the efficiency of the first catalytic reforming reactor.

The supported platinum-containing polymetallic catalyst comprises platinum and at least one additional Group VIII noble metal constituent, such as iridium, rhodium, ruthenium or palladium, deposited upon a high surface area porous support. Inorganic refractory oxides, preferably the eta or gamma forms of alumina, are the preferred support compositions; however, the other support materials mentioned with reference to the naphthene dehydrogenation catalyst may also be used. As with the naphthene dehydrogenation catalyst, the tail zone desirably contains combined halogen, preferably chlorine and/or fluorine. The halogen may be added to the catalyst in any suitable manner either during preparation of the support or following or preceding the deposition of the catalyst metals and/or other promoter. A platinum-iridium-chlorine-alumina composite is the prefered tail zone catalyst.

The initial zone and tail zones catalysts may be prepared by any of several different conventional methods (see U.S. Pat. 2,848,377 the manufacture of platinum-iridium catalysts) all of which are intended to be within the scope of the instant invention. The prefered method is illustrated by the preparation of a platinum-iridium-chlorine-alumina catalyst. Alumina is coimpregnated with an aqueous solution of chloroplatinic and chloroiridic acids, after which the composite is dried at a temperature of about 220°–250° F. The dried catalyst is then calcined at a temperature not exceeding about 500°–700° F. in air or nitrogen. For the preparation of bimetallic catalysts of platinum and other Group VIII metals, aqueous solutions of the chlorides, acid chlorides, or in some cases the nitrates, may conveniently be used in the coimpregnation step.

The tail zone catalysts will generally contain about 0.01 to 2.0 weight percent of platinum, preferably 0.1 to 1.0 weight percent, and about 0.01 to 2.0 weight percent of the additional Group VIII noble metal, preferably about 0.1 to 1.0 weight percent, the remainder of the catalyst comprising the support and from about 0.01 to 4.0 weight percent, preferably 0.01 to 1.5 weight percent combined halogen.

Conditions within the several catalyst reactors may vary within relatively wide ranges. Pressure, for instance, may vary between 0 and 900 p.s.i.g., preferably between 15 and 600 p.s.i.g., and most preferably between 100 and 500 p.s.i.g. Temperatures within the catalytic reforming zones may also vary broadly. Generally, temperatures between 600° and 1050° F. are satisfactory; preferred temperatures are between 700° and 1000° F., and most preferred temperatures are between 780° and 980° F. Temperature and pressure will, of course, be a function of the particular feed stream utilized. Hydrogen is circulated or recycled through the reactor zones at a rate of 0 to 15,000 standard cubic feet per barrel of liquid naphtha feed, preferably 1000 to 10,000 standard cubic feet. and most preferably 2000 to 6000 cubic feet per barrel.

The space velocity which is expressed as weight in pounds of feed charged per hour per pound of catalyst, depends upon the activity level of the catalyst, the character of the feed stock and the desired octane number of the product. Ordinarily it may vary from about 0.2 w./hr./w. to 20 w./hr./w., preferably from about 0.5 w./hr./w. to about 10 w./hr./w. and most preferably from about 1 to 5 w./hr./w. based on the total catalyst in the system. It is preferred to use the initial and tail zone catalysts in the form of pellets or extrudates which are preferably 1/16 to 3/4 inch in diameter.

In a preferred embodiment of the instant invention, a train of four catalytic reforming reactors is utilized. The third and fourth reactors, which constitute the tail reaction zone, contain a bimetallic catalyst comprising platinum-iridium on an alumina support. The catalyst comprises about 0.1 to 1.0 weight percent of iridium and about 0.1 to 1.0 weight percent of platinum and the remainder alumina and halogen, the latter ranging from 0 to 2.0 weight percent. The catalyst is prepared by coimpregnation of the alumina with an aqueous solution of chloroplatinic and chloroiridic acids. About 0.7 ml. of solution is used per gram of alumina. It is then dried at 230° F. and subsequently calcined in air at 500° F. The finished catalyst is formed into ⅛ inch pellets and charged to the reforming reactors. In the first two reactors (initial reaction zone) there is a standard reforming catalyst which comprises about 0.6 weight percent platinum-on-alumina, prepared by impregnation of alumina with chloroplatinic acid. The finished catalyst is used in the form of ⅛ inch cylindrical pellets. The amount of catalyst charged to the first two reactors is about 25 to 75 weight percent of the total catalyst employed in all the reactors. The process feed stock is a naphtha cut boiling between about 120° and 400° F. at atmospheric pressure and comprises about 15 to 75 weight percent paraffins, about 15 to 75 weight percent naphthenes, and about 2 to 20 weight percent aromatics. The feed stock is introduced at a weight hourly space velocity of about 0.5 to 10 pounds of feed per hour per pound of total catalyst in the system. Suitable reforming conditions include reactor temperatures and pressures in the range of 700° to 1000° F. and 100 to 500 p.s.i.g., respectively. The hydrogen recycle gas rate is 1000 to 10,000 standard cubic feet per barrel of naphtha feed.

The product issuing from the first two reactors contains about 2 to 15 weight percent naphthenes, the remainder comprising paraffins, both normal and iso, and aromatics. After passage through the third and fourth reactors containing the bimetallic platinum-iridium catalyst, the product is separated into two fractions, one containing $C_5$ and higher molecular weight hydrocarbons and the other $C_4$ and lower molecular weight hydrocarbons. The $C_5+$ fraction contains 60 to 80 weight percent aromatics, or higher, with research clear octane numbers in the range of 90 to 105, or higher.

DESCRIPTION OF THE PREFERRED EMBODIMENTS

Example 1

In this example, a naphtha feed stream is treated by a standard commercial catalytic reforming technique. The feed is a mixed Louisiana naphtha boiling at atmospheric pressure in the range of 200° to 325° F. The constituents of the feed stream are as follows: 40% naphthenes, 45% paraffins, 15% aromatics (by weight). It is passed through a series of four catalytic reforming reactors. In each reactor there is a catalyst which comprises 0.6 weight percent of platinium on alumina, prepared by impregnation of alumina with chloroplatinic acid, followed by drying and calcination in air at 1000° F. This is a conventional method of preparation of a platinum reforming catalyst. The catalyst is charged to the reactors in the form of ⅛ inch cylindrical pellets. The surface of the alumina support used in the catalyst is about 175 m.²/gm. The weight hourly space velocity of the feed is two pounds per hour per pound of catalyst. Inlet reactor reactor temperatures are maintained at 940° F., average pressure is 300 p.s.i.g. Hydrogen recycle is about 5000 stnadard cubic feet per barrel of naphtha feed. After passing through the four catalytic reforming reactors, a product is obtained which has a research clear octane number of about 99.

Example 2

In this example the same feed stream is catalytically reformed under identical processing conditions. There is, however, one significant difference; the platinum-on-alumina catalyst in the third and fourth reactors is replaced by a bimetallic platinum-iridium on alumina catalyst. The bimetallic catalyst comprises about 0.1 weight percent iridium, about 0.5 weight percent platinum, about 0.6% chlorine, and the remainder alumina. The catalyst is prepared by coimpregnation of alumina with an aqueous solution of chloroplatinic and chloroiridic acids, followed by drying and calcination in air at 500° F. The catalyst is used in the form of ⅛ inch cylindrical pellets.

The feed stream, after passing over the platinum-on-alumina catalyst in the first two reactors, has the following composition: 5 weight percent naphthenes, 55 weight percent aromatics, and 40 weight percent paraffins. After passing through the third and fourth reactors which contain the supported platinum-iridium catalyst, the product recovered has a research clear octane number of 103 or higher.

When comparing the octane rating of the product obtained from the process of Example 2 with that of Example 1, a difference of at least 4 octane numbers is noted. This difference is attributable to the improved ability of the platinum-iridium catalyst for catalyzing the reactions responsible for octane number improvement beyond the point where the naphthenes have been essentially completely converted to aromatics.

Example 3

In this example the exact conditions and proportions of Example 2 are utilized except that the platinum-iridium catalyst is replaced by a platinum-rhodium catalyst, which is supported on alumina. All other conditions are identical; the recovered product has a research clear octane of 102 or higher. The catalyst would be prepared by the same procedure used in Example 2 except that rhodium trichloride would be used in place of chloroiridic acid for the impregnation step.

Example 4

In this example the exact conditions and proportions of Example 2 are utilized except that in the third and fourth reactors a catalyst which comprises platinum and ruthenium is utilized in place of the platinum-iridium; the contents of platinum and the second metal, and also the alumina support, are the same as in Example 2. A product is recovered which has a research clear octane number of 100 or higher.

The catalyst is prepared by the procedure of Example 2 except that ruthenium trichloride is used in place of chloroiridic acid for the impregnation step.

What is claimed is:

1. A catalytic reforming process which comprises contacting hydrogen and a naphtha feed stock comprising paraffins and naphthenes at reforming conditions with a supported platinum-containing naphthene dehydrogenation catalyst that is substantially free of a catalyst specie consisting of platinum and iridium contained on alumina to form a product stream and thereafter contacting hydrogen and at least a portion of said product stream at reforming conditions with a different polymetallic catalyst comprising platinum and at least one additional Group VIII noble metal selected from the group consisting of iridium, rhodium and ruthenium and about 0.01 to 4.0 weight percent combined halogen contained on a porous support.

2. The process of claim 1 wherein said polymetallic catalyst comprises platinum and iridium contained on a porous support.

3. The process of claim 2 wherein said porous support is a refractory inorganic oxide.

4. The process of claim 1 wherein said polymetallic catalyst comprises from 0.01 to 2.0 weight percent platinum, 0.01 to 2.0 weight percent iridium, and from about 0.01 to 4.0 weight percent combined halogen contained on a porous support.

5. The process of claim 1 wherein said naphthene dehydrogenation catalyst comprises platinum and combined halogen contained on a refractory inorganic oxide support.

6. The process of claim 1 wherein said naphthene dehydrogenation catalyst is 0.01 to 2.0 weight percent platinum and 0.01 to 4.0 weight percent combined halogen contained on a refractory inorganic oxide support.

7. The process of claim 4 wherein said porous support is alumina.

8. A catalytic reforming process which comprises contacting hydrogen and a naphtha feed stock comprising paraffins and naphthenes at reforming conditions with a first catalyst comprising 0.01 to 2.0 weight percent platinum and from 0.01 to 4.0 weight percent combined halogen contained on alumina, said catalyst being substantially free of a catayst specie consisting of platinum and iridium contained on alumina, thereby forming a product stream and thereafter contacting hydrogen and at least a portion of said product stream at reforming conditions with a different polymetallic catalyst comprising 0.01 to 2.0 weight percent platinum, 0.01 to 2.0 weight percent of a metal selected from the group consisting of iridium, rhodium and ruthenium, and 0.01 to 4.0 weight percent combined halogen contained on alumina.

9. The process of claim 8 wherein said combined halogen is chlorine.

10. The process of claim 8 wherein each contacting operation is conducted at a temperature varying between about 700° to 1000° F. and a pressure ranging from between about 15 to 600 p.s.i.g.

11. The process of claim 8 wherein said naphtha feed stock contains at least about 15 weight percent naphthenes and said product stream contacted with said different polymetallic catalyst contains less than about 15 weight percent naphthenes.

12. In the catalytic reforming of a naphtha feed stock boiling in the naphtha range and comprising paraffins, naphthenes and aromatics wherein said naphtha feed stock and hydrogen is contacted with a first catalyst in an initial zone which consists essentially of platinum and 0.01 to 1.5 weight percent combined chlorine on a refractory inorganic oxide support at catalytic reforming conditions and the said naphthenes are converted to aromatics, the improvement which comprises contacting said feed stock in a tail zone after the level of naphthenes has been reduced to a maximum of about 15 weight percent of the feed stock and hydrogen with a supported bimetallic catalyst, said catalyst consisting essentially of about 0.01 to 2.0 weight percent of patinum, 0.1 to 2.0 weight percent of a Group VIII metal selected from the group consisting of iridium, rhodium, and ruthenium and 0.01 to 1.5 weight percent combined chlorine contained on a refractory inorganic oxide support and recovering a high octane product.

13. The process of claim 12 wherein said bimetallic catalyst is supported platinum-iridium.

14. The process of claim 13 wherein said support of said initial zone and tail zone catalysts is alumina.

15. A catalytic reforming process which comprises contacting hydrogen and a naphtha feed stock boiling between about 120° and 400° F. at a temperature varying between about 700° and 1000° F. and a pressure ranging from about 100 to 500 p.s.i.g. in the presence of a catalyst comprising 0.01 to 2.0 weight percent platinum and from 0.01 to 1.5 weight percent combined chlorine contained on alumina, said catalyst being substantially free of a catalyst specie consisting of platinum and iridium contained on alumina, thereby forming a product stream and thereafter contacting hydrogen and at least a portion of said product stream at a temperature varying between about 700° to 1000° F. and a pressure ranging from about 100 to 500 p.s.i.g. with a different polymetallic catalyst comprising 0.01 to 2.0 weight percent platinum, 0.01 to 2.0 weight percent iridium and 0.01 to 1.5 weight percent combined chlorine contained on alumina.

16. The process of claim 15 wherein said initial catalyst comprises platinum, rhenium and combined chlorine contained on alumina, said catalyst metals comprising about 0.01 to 2.0 weight percent of said catalyst.

17. The process of claim 1 wherein said combined halogen of said polymetallic catalyst is chlorine.

18. The process of claim 17 wherein said porous support is alumina.

19. The process of claim 8 wherein said different catalyst comprises from 0.01 to 2.0 weight percent platinum, 0.01 to 2.0 weight percent iridium and from about 0.01 to 4.0 weight percent combined halogen contained on alumina.

20. The process of claim 19 wherein said combined halogen is chlorine.

21. The process of claim 1 wherein said support of said naphthene dehydrogenation catalyst and said different polymetallic catalyst is alumina.

22. The process of claim 5 wherein the combined halogen on said naphthene dehydrogenation catalyst is chlorine and said naphthene dehydrogenation catalyst is supported on alumina.

23. The process of claim 22 wherein said combined halogen of said different polymetallic catalyst is chlorine and said different polymetallic catalyst is supported on alumina.

24. The process of claim 1 wherein said naphthene dehydrogenation catalyst comprises platinum, rhenium and 0.01 to 1.5 wt. percent combined chlorine contained on alumina, said catalyst metals comprising about 0.01 to 2.0 wt. percent of said catalyst.

25. The process of claim 24 wherein said different polymetallic catalyst comprises from 0.01 to 2.0 wt. percent platinum, 0.01 to 2.0 wt. percent iridium and from 0.01 to 1.5 wt. percent combined chlorine contained on alumina.

26. The process of claim 8 wherein said first catalyst comprises platinum, rhenium and from about 0.01 to 1.5 wt. percent combined chlorine contained on alumina, said catalyst metals comprising about 0.01 to 2.0 wt. percent of said catalyst.

27. The process of claim 12 wherein said first catalyst contains from about 0.01 to 2.0 wt. percent platinum, based on total catalyst.

References Cited
UNITED STATES PATENTS

| | | | |
|---|---|---|---|
| 2,848,377 | 8/1958 | Webb | 208—138 |
| 3,392,107 | 7/1968 | Pfefferle | 208—65 |
| 3,424,669 | 1/1969 | Carter et al. | 208—65 |
| 3,660,271 | 5/1972 | Keith et al. | 208—65 |
| 3,507,780 | 4/1970 | Spurlock et al. | 208—138 |
| 3,554,902 | 1/1971 | Buss | 208—138 |

HERBERT LEVINE, Primary Examiner

U.S. Cl. X.R.

208—139